Aug. 31, 1965   HENRY ST. G. T. CARMICHAEL, JR   3,203,396
METHOD OF AND MEANS FOR MODIFYING RACE COURSES
Filed Oct. 7, 1963                                                2 Sheets-Sheet 1
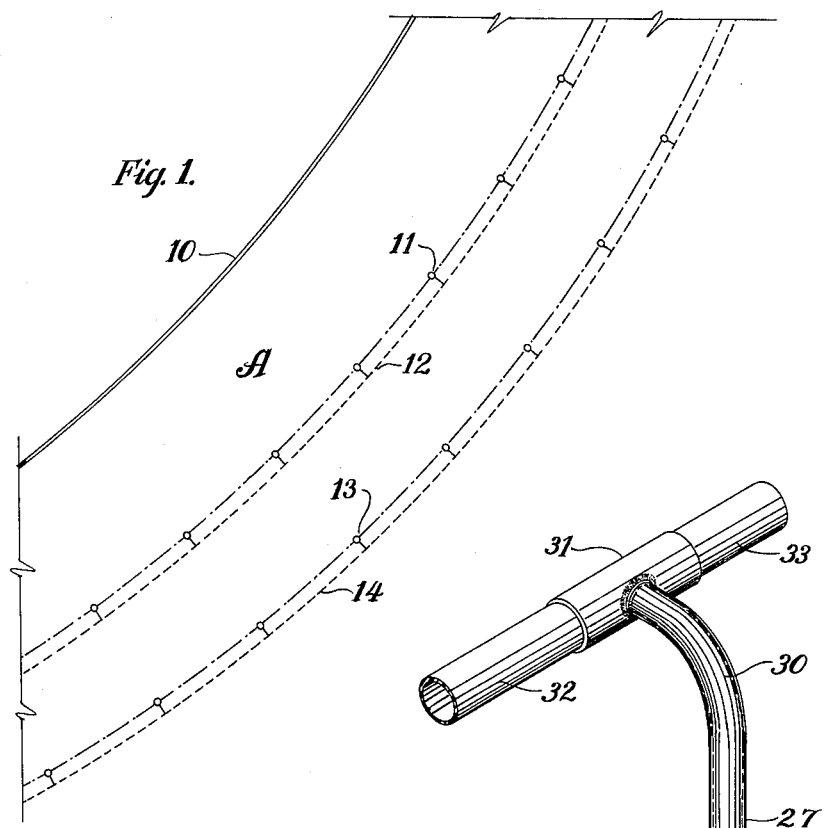
INVENTOR
Henry St. G.T. Carmichael, Jr.
BY  W. E. Sherwood
ATTORNEY Aug. 31, 1965   HENRY ST. G. T. CARMICHAEL, JR   3,203,396
METHOD OF AND MEANS FOR MODIFYING RACE COURSES
Filed Oct. 7, 1963                                           2 Sheets-Sheet 2

INVENTOR
Henry St G. T. Carmichael, Jr.

BY   W. E. Sherwood
                        ATTORNEY

United States Patent Office 3,203,396
Patented Aug. 31, 1965

3,203,396
METHOD OF AND MEANS FOR MODIFYING RACE COURSES
Henry St. G. T. Carmichael, Jr., 424 W. 2nd St., Lexington, Ky.
Filed Oct. 7, 1963, Ser. No. 314,469
7 Claims. (Cl. 119—15.5)

This invention relates to an improved method of and means for modifying the usable racing area of a race course, and more particularly to race courses on which horses are to race without the likelihood of injury resulting from such modifications of the racing area.

A typical employment of the invention is found in turf racing and wherein the turf is subjected to excessive wear and tear if the inner boundary of the course remains unchanged. This problem has long been recognized and various attempts to solve the same have been proposed, but, so far as I am aware, all such attempts have been attended by various disadvantages, and which it is a purpose of this invention to overcome.

As will be understood, the invention is applicable to use with the conventional turf course for hurdles and steeplechase racing, with turf courses for flat racing, or with flat racing on dirt tracks. For example, when an inner boundary in the form of rails supported upon posts is employed, it has been the custom to form holes in the tracks or courses to support those posts and thereafter to fill the holes with track material after the posts are removed. Not only is this a laborious procedure, but if some holes are inadequately filled, or not filled at all, a hazard exists for the horses later to run on the track. As is known, the impact of a hoof of a racing horse places a tremendous loading on the ground at the point of impact and it is desirable that the track surface offer a substantially uniform, firm, and yet resilient resistance to the hoof at any point where such an impact may occur.

It is an object of the invention, therefore, to provide an improved method and means for modifying the usable racing area of race courses in a manner which will insure suitable protection to horses racing on such a modified course.

Another object is to provide an improved permanently emplaced means for use in modifying the usable racing area of race courses and which, after once being installed, may thereafter be used repeatedly with less labor than required by conventional means.

Another object is to provide an improved plug member for safely covering holes in racing courses and having an appearance and resistance to hoof impact which does not disturb or injure horses racing on the course.

Other objects and advantages will become more apparent as the description proceeds and when considered in conjunction with the accompanying drawings in which:

FIG. 1 is a diagrammatic view of a small portion of a race course indicating the relative locations of a permanent and of a pair of temporary inner boundaries therefor.

FIG. 2 is a perspective view of one of the posts and its rails in supported position and when serving as part of a temporary boundary for the course.

Figure 3:
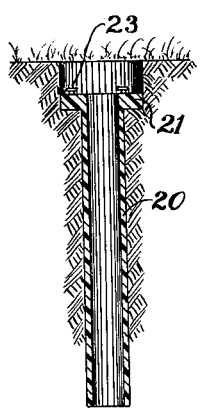
FIG. 3 is a vertical sectional view of one of the ground-embedded tubes.

Considering first FIG. 1, a race course having a racing area generally indicated at A will have a permanently fixed inner boundary 10 which conventionally may be formed of a hedge, a series of fixed posts interconnected by horizontal rails located about forty-six inches from the ground, or other means which serves as a reference boundary for the horses and their riders during a race. In accordance with the method of the present invention, an array 11 of generally vertically arranged hollow tubes are embedded in the ground at a substantially uniform distance outboard of the fixed boundary 10 and with their upper ends beneath the surface of the ground. These tubes, after once being installed, remain in place and serve to support a temporary boundary means, as later to be described, comprising an array 12 of demountable posts and rails, which when in place, will remove the area A from racing usage. When the array 12 of posts and rails is removed in order to bring area A back into racing usage, the open ends of the tubes are covered with special plug members, later to be described. When it is desired to remove more of the racing course than is represented by area A from usage, a similar array 13 of tubes and a similar array 14 of posts and rails may be employed. In this arrangement, it will be understood that only one set of posts and rails will be used, and which, after the uncovering of the ends of the tubes of the array 13, are supported thereon; the tubes of the first array 11 meanwhile having been recovered to prevent extraneous material from entering the same. In general, the measured distance for the race at many courses conforms to a path which lies about three feet outboard of the fixed inner boundary 10 and therefore, the location of the array 11 of tubes will normally be separated a greater distance from boundary 10 than from the second array 13 of tubes. It is contemplated that a suitable template structure (not shown) will be employed in spotting the location of these tubes and, as an example, adjacent tubes in each array may be spaced nine feet apart and with adjacent arrays of tubes also being nine feet apart.

Figure 4:
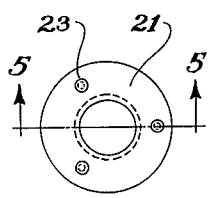
FIG. 4 is a top plan view to a larger scale of the ground-embedded tube, flange member, and securing means.
Figure 7:
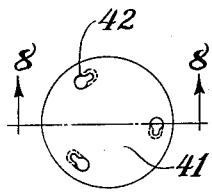
FIG. 7 is a bottom plan view to a larger scale of the plug member.
Figure 5:
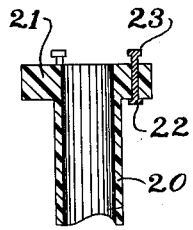
FIG. 5 is a sectional view taken on line 5—5 of FIG. 4 and showing one form of securing means.
Figure 8:
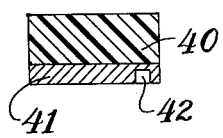
FIG. 8 is a sectional view of the plug member taken on line 8—8 of FIG. 7.

Referring now to FIGS. 3 to 5, a typical tube 20 having a uniform internal diameter may be formed of a molded plastic material such as polyvinyl chloride, and carries at its upper end a peripheral annular flange 21 integral therewith. Suitably fastened to this flange and projecting above the upper surface thereof is a plurality of metallic studs 22 having slot-engaging locking heads 23 spaced uniformly from each other around the flange. As alternative constructions, the flange portion may comprise an annular metallic disc with integral metallic studs and being bonded to an extruded plastic tube; or the entire tube flange and stud arrangement may be made of metal. However, since the assembly will normally remain embedded in the ground for a period of years, I prefer to employ plastic material with its non-corrodible characteristics for forming both the tube and flange structure. In the initial installation of this structure a vertical hole is formed in the ground with a suitable annular enlargement at the ground surface to accommodate the flange of the tube and to permit the upper surface of that flange to be disposed a substantial distance, for example about four inches, beneath the ground surface.

Figure 9:
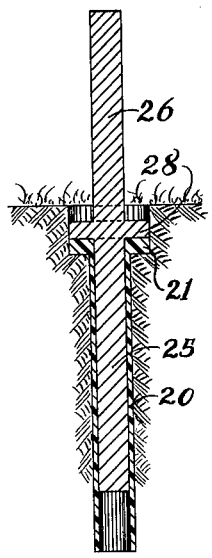
FIG. 9 is a vertical sectional view of the ground-embedded tube with the post supporting means in place thereon.
Figure 11:
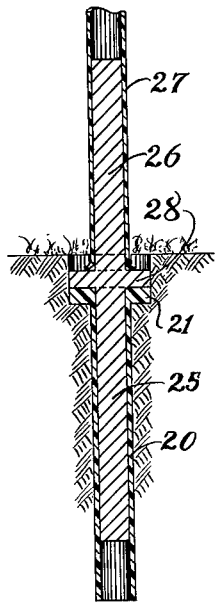
FIG. 11 is a vertical sectional view of the ground-embedded tube, post supporting means, and post.
Figure 10:
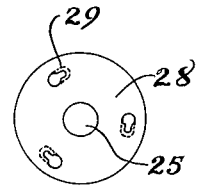
FIG. 10 is a bottom plan view to a larger scale of the post supporting means.

Adapted for engagement with the thus described structure and as best shown in FIGS. 9 to 11 is a metallic post-supporting means, or stud, having an elongated lower portion 25 with an outer diameter slightly less than the inner diameter of tube 20 and an elongated upper portion 26 axially aligned with the lower portion and with an outer diameter slightly less than the inner diameter of the post 27 which is to be supported. At the junction of the upper and lower portions and rigid therewith, a flat circular plate 28 is provided having a plurality of key-like slots 29 in its lower face as indicated by FIG. 10.

These slots at their enlarged portions are adapted to re-receive the heads 23 of the studs 22 and at their narrowed portions are adapted to lock the post-supporting means to the flange of the hollow tube after the post-supporting means is rotated through a small angle.

Referring now to FIG. 2, the post 27 which is conventional, may comprise a generally vertical tubular portion adapted to slip over the post-supporting means and with its lower end resting loosely upon the upper surface of plate 28. Such a post preferably is formed of a plastic such as polyvinyl chloride and at its upper end includes an arched portion 30 supporting a horizontally arranged hollow coupling rail receiving member 31 to one side, for example, about twelve inches distance, from the vertical axis of the post. This coupling has an internal diameter sufficiently large to receive for sliding movement therein the ends of adjacent rails 32 and 33 which likewise preferably are tubular and are formed of a plastic material such as polyvinyl chloride. As will thus be apparent, when an appropriate number of posts 27, with rails interconnecting adjacent posts, are installed in the form of the array 12 upon the array 11 of embedded tubes, a temporary inner boundary is formed for the race course and the area A will be removed from racing usage. The described posts and rails are strong enough to withstand the brushing of a horse or rider thereagainst due to their secure mounting upon the embedded tubes, and yet have sufficient resiliency to prevent injury to the horse or rider should normal contact occur.

Figure 6:
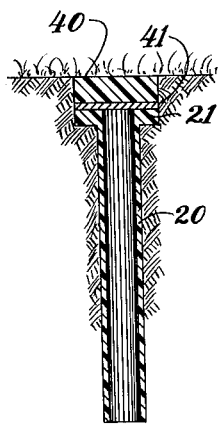
FIG. 6 is a vertical sectional view of one of the ground-embedded tubes with the plug member in place thereon.

When it is desired to restore the area A to racing usage, a crew of workers with a vehicle containing the plug members, now to be described, moves alongside the array 12 and dismantles the same by removing the light-weight interconnecting rails and by lifting the posts 27 from the post-supporting-means. Thereafter, at each station the post-supporting-means is rotated to unlock the same from the flange of the embedded tube and the separated rail, post, and post-supporting-means are loaded upon the vehicle. The open end of the thus uncovered tube is then capped as seen in FIG. 6 and this procedure is continued until the entire array 12 of posts and rails has been removed and the entire array 11 of tubes has been covered.

As a significant feature of the invention, I provide a special plug member for use in this capping procedure and which comprises a thick pad portion 40 of resilient plastic material such as the material marketed under the trademark "Tartan" by Minnesota Mining and Manufacturing Corporation. The pad 40, which may be in the order of three inches in thickness and of a configuration suitable to fill completely the hole in the ground above the embedded tube and to leave the top of the pad level with the ground, is bonded on its lower surface to a flat metallic disc 41 having slots 42 on its lower surface similar to the slots 29 in the above-described plate 28 of the post-supporting-means. When this plug member is turned angularly with its slots in engagement with the studs 22, it becomes locked in snug engagement with the flange of the stationary tube and should the hoof of a horse later strike the plug member, the plug member will not become dislodged nor injure the horse. The plastic material comprising the pad portion 40 is colored to conform to the color of the grass race course or dirt race track on which it is employed; for example, a green, brown, or reddish hue, and accordingly does not present a color discrepancy which might cause a horse to shy.

Moreover, the plastic material forming the pad portion 40 is chosen to have a resiliency generally equal to that of the sod or dirt comprising the turf race course or dirt track, and thus, does not establish hard or soft spots in the area over which the horses are racing.

In general, the described arrays of embedded tubes will be located around the entire periphery of the race course when the course is of an oval configuration. However, the invention is not limited to such an arrangement, and indeed may be used to establish a temporary boundary only at turns in the oval course, or even alongside a straight portion of a non-oval race course. Moreover, the invention may be employed in connection with race courses other than those used for horse racing.

Having thus described the invention, with respect to a method and means for carrying out of the same, it will be understood that other modifications of the same may be employed without departing from the true spirit and scope of the invention. It is intended, therefore, that the foregoing disclosure is to be treated in an illustrative, rather than a limiting sense and that the invention is to be considered as limited only by the scope of the appended claims.

What I claim as new and desire to secure by Letters Patent of the United States is:

1. In combination, a race course comprising an area of ground over which the contestants in a race normally pass, and means for temporarily removing said ground area from racing usage by adjustment of a boundary of the race course and including, a hollow tube permanently embedded in the ground area to be removed from racing usage and having a peripheral flange at its upper end disposed a substantial distance beneath the surface of the ground, an elongated post-supporting-means having a lower portion extending into said tube and an upper portion extending above the ground, means for detachably joining said post-supporting-means to said flange and comprising means for rotationally interlocking said flange and said post-supporting-means through an interlockable stud and slot arrangement, a hollow post detachably supported by and surrounding said upper portion of said post-supporting-means, and a generally horizontal rail carried by said post and serving to define a portion of the boundary of said race course.

2. Apparatus as defined in claim 1 wherein said stud is carried by said flange and said slot is carried by said post-supporting-means.

3. In combination, a race course comprising an area of ground over which horses normally pass and which is periodically removed from racing usage, and means forming a portion of said area of race course and including a hollow tube permanently embedded vertically in the ground and having a peripheral flange at its upper end disposed a substantial distance beneath the surface of the ground, a plug member covering the upper end of said tube and rendering the area adjacent said tube suitable for racing, said plug member having a resilient upper portion adapted to lie generally flush with the surface of the ground and having in its lower portion a means for detachably securing the plug member to said flange and comprising an interlockable stud and slot means, and a post-supporting-means insertable in said hollow tube when said plug member is removed and having securing means interlocking with one of said interlockable means.

4. Apparatus as defined in claim 3 wherein said stud is carried by said flange and said slot is carried by said plug member.

5. Apparatus as defined in claim 3 wherein said resilient upper portion of said plug member comprises plastic material having a color substantially similar to the color of the ground surface surrounding said plug member.

6. The method for modifying the usable racing area of a race course having a permanently fixed inner boundary comprising, permanently embedding in the ground area at a substantially uniform distance outboard of said fixed boundary and in a ground area later to be used for racing a plurality of generally vertically arranged hollow tubes having their upper ends disposed a substantial distance beneath the surface of the ground, partially inserting studs in said tubes, detachably supporting upon said studs and tubes a corresponding number of generally vertically arranged hollow posts having rail means connecting adjacent posts on each side of the posts and serving to provide a temporary inner boundary for said race course, thereby to remove from racing usage, while said posts are supported upon said studs and tubes, the ground area lying between said fixed and temporary boundaries, and thereafter re-establishing for racing usage the ground area previously removed from racing usage by removing said posts and rail means from their supported position upon said studs and tubes, and said studs from their position within said tubes, and by replacing the same with a corresponding number of resilient plugs detachably held in place by said tubes and covering the upper ends thereof and having their upper surfaces substantially level with said ground surface.

7. In combination a race course comprising an area of ground over which contestants in a race normally pass, and means for temporarily removing said ground area from racing usage by adjustment of a boundary of the race course and including, a hollow tube permanently embedded in the ground area to be removed from racing usage and having a peripheral flange at it upper end disposed a substantial distance beneath the surface of the ground, an elongated post-supporting-means having a lower portion extending into said tube and an upper portion extending above the ground, means for detachably joining said post-supporting-means to said flange, a hollow post detachably supported by and surrounding said upper portion of said post-supporting-means, and a generally horizontal rail-receiving member carried by said post and extending laterally of said post and receiving adjacent rails serving to define a portion of the boundary of said race course.

References Cited by the Examiner

UNITED STATES PATENTS

| 762,645 | 6/04 | May | 256—32 |
| 1,523,221 | 1/25 | Kendall | 256—24 |
| 1,965,639 | 7/34 | Glass | 189—28 |
| 1,991,087 | 2/35 | Falcon | 189—28 |
| 2,558,695 | 6/51 | Unger | 285—6 |
| 2,847,683 | 8/58 | Jordan | 4—295 |
| 3,099,247 | 7/63 | Bieber | 272—5 X |

SAMUEL KOREN, *Primary Examiner.*

RICHARD C. PINKHAM, *Examiner.*